United States Patent
Imbimbo et al.

(10) Patent No.: US 9,166,960 B2
(45) Date of Patent: Oct. 20, 2015

(54) MOBILE RADIO ACCESS INFORMATION VALIDATION

(75) Inventors: Amedeo Imbimbo, Caivano (IT); Salvatore Loreto, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 740 days.

(21) Appl. No.: 13/127,335

(22) PCT Filed: Nov. 4, 2008

(86) PCT No.: PCT/EP2008/064918
§ 371 (c)(1),
(2), (4) Date: Aug. 29, 2011

(87) PCT Pub. No.: WO2010/051829
PCT Pub. Date: May 14, 2010

(65) Prior Publication Data
US 2011/0299462 A1    Dec. 8, 2011

(51) Int. Cl.
| | | |
|---|---|---|
| H04W 4/00 | (2009.01) | |
| H04L 29/06 | (2006.01) | |
| H04W 4/02 | (2009.01) | |
| H04L 29/08 | (2006.01) | |
| H04M 3/22 | (2006.01) | |

(52) U.S. Cl.
CPC ............. *H04L 63/08* (2013.01); *H04L 63/107* (2013.01); *H04L 63/30* (2013.01); *H04L 67/18* (2013.01); *H04L 67/2814* (2013.01); *H04W 4/02* (2013.01); *H04W 4/021* (2013.01); *H04M 3/2281* (2013.01); *H04M 2242/04* (2013.01); *H04M 2242/30* (2013.01)

(58) Field of Classification Search
USPC ................. 370/328, 351; 455/456.1; 713/168
See application file for complete search history.

(56) References Cited

U.S. PATENT DOCUMENTS

| | | | |
|---|---|---|---|
| 7,403,607 B2 * | 7/2008 | Hession et al. .......... 379/265.12 |
| 7,434,045 B1 * | 10/2008 | Enderwick et al. ........... 713/158 |
| 7,991,385 B1 * | 8/2011 | Rosenberg et al. ........... 455/406 |
| 2002/0126701 A1 | 9/2002 | Requena |
| 2004/0224664 A1 * | 11/2004 | Guo .............................. 455/411 |
| 2008/0112551 A1 * | 5/2008 | Forbes et al. ............... 379/142.1 |
| 2010/0100737 A1 * | 4/2010 | Chapman ...................... 713/168 |
| 2011/0090903 A1 * | 4/2011 | Jonsson et al. ................ 370/352 |

OTHER PUBLICATIONS

Polk, J. et al. "Location Conveyance for the Session Initiation Protocol." SIP Working Group, Internet Draft, Expires: Apr. 30, 2009, Intended Status: Standards Track (PS), draft-ieft-sip-location-conveyance-11.txt, Oct. 30, 2008.

(Continued)

*Primary Examiner* — Donald Mills
*Assistant Examiner* — Henry Baron
(74) *Attorney, Agent, or Firm* — Coats and Bennett, PLLC

(57) ABSTRACT

A validation method for validating IP information header in data packets from user equipment connected to a mobile telecommunications network (1) and accessing an IP network (5) through a proxy. In the method trusted location information of the user equipment (2) from a trusted source of the telecommunications network is requested (109). Then, the trusted location information is inserted into the IP information header of a message (112) to be sent to a location based function (17).

23 Claims, 3 Drawing Sheets

(56) References Cited

OTHER PUBLICATIONS

Garcia-Martin, M. et al. "Private Header (P-Header) Extensions to the Session Initiation Protocol (SIP) for the 3rd-Generation Partnership Project (3GPP)." Network Working Group, Request for Comments: 3455, Category: Informational, Jan. 2003.

Faggion, N. et al. "Alcatel End-to-End Location-Based Services Solution." Technology White Paper, 2005.

* cited by examiner

MOBILE RADIO ACCESS INFORMATION VALIDATION

TECHNICAL FIELD

The present invention relates to mobile communications networks having a connection to an IP network and in which access network information such as location information is available.

BACKGROUND

In modern mobile telecommunications networks, a service provider may wish to know information about the access network that a subscriber is currently using. Some services are more suitable or less suitable depending on the access type, and some services are of more value to subscribers if the access network details are known by the network proxy which provides the user with services.

In other cases, the service provider may simply wish to know crude location information in order to provide certain services to the user. For example, many of the location based services available in wireless networks today require the home network to know the identity of the cell the user is being served by.

Some regulatory requirements also exist which require that, for cellular radio systems, the identity of the cell where an emergency call is established is made available to the emergency authorities.

In mobile telecommunications networks some services may be provided via an IP Multimedia Subsystem (IMS), which is a sub-network used for allowing a subscriber to access multimedia services via Internet Protocol (IP).

The IMS uses Session Initiation Protocol as a signaling protocol for setting up and tearing down multimedia communication sessions. SIP messages are exchanged between the User Agents (UAs), which may be user equipment having a SIP communication function, and SIP servers or proxies, collectively called Call Session Control Function (CSCF), which can process SIP signaling packets in the IMS.

SIP messages can contain private SIP headers (P-headers) that can be used only within trustable networks such as the 3rd-Generation Partnership Project (3GPP) networks. Among the P-headers, the so called P-Access-Network-Info header is used by SIP User Agents to relay information about the access technology to proxies that are providing services.

A proxy which is providing services to a UA may act upon any information present in the P-Access-Network-Info header value, if is present, to provide a different service depending on the network or the location through which the UA is accessing the server. For example, for cellular radio access networks the SIP proxy located in the home network may use the cell ID to provide basic localized services.

The handling of the P-Access-Network-Info header leads to problems, particularly in Lawful Interception (LI) systems and Data Retention systems (DRS).

In the LI solution, the Intercept Related Information (IRI) provided by a node to the Law Enforcement Mediation Function (LEMF) through the DF2 mediation may contain the P-Access-Network-Info (the only available location information), but a rogue UA could insert incorrect information in this field since the issuance of the Invite SIP message and influence lawful investigations on the UA that may be target of interception.

If a lawful agency orders the interception on target users both in GPRS nodes and in IMS nodes, it could receive different user location information.

An analogous problem can occur for the data retention solution. The only available location information provided by the IMS nodes is given by the P-Access-Network-Info. Also in this case incorrect information provided by the UA could influence lawful investigations.

Similar problems may generally occur in all those situations in which location information is provided to a function which relies on the user location, such as a charging system.

SUMMARY

The aim of the present invention is to provide a method and a device that overcome the above mentioned drawbacks.

This aim and other objects which will become better apparent hereinafter are achieved by a validation method for validating IP information header in data packets from user equipment connected to a mobile telecommunications network and accessing an IP network through a proxy. In the method trusted location information of the user equipment from a trusted source of the telecommunications network is requested. Then, the trusted location information is inserted into the IP information header of a message to be sent to a location based function.

In preferred embodiments of the invention, an IP information header comprising access network information is detected. More specifically, data contained in the IP information header is extracted and the user equipment is identified. The trusted location information provided by the trusted source is then compared with location information detected in the IP information header.

The information header may be asserted if location information in the information header corresponds to the location information provided from the trusted source.

Otherwise, the location information in the information header may be stripped if the location information in the information header does not correspond to the location information provided from the trusted source.

The location information in the information header may be replaced by the trusted location information if the information header does not correspond to location information provided from the trusted source.

In the preferred embodiments of the invention, the IP network includes an IP Multimedia Subsystem and the proxy is a Call Session Control Function CSCF able to process Session Initiation Protocol SIP signaling packets in the IP Multimedia Subsystem. In this case, the data packets may be SIP signaling packets and the IP information header is a P-Access-Network-Info header.

The proxy may be an Interception Control Element connected to a Lawful Interception system, which is the location based function. In this case, the proxy is configured to send the Lawful Interception system Intercept Related Information comprising the trusted location information.

The proxy may also be a data source, connected to a Data Retention system, which is the location based function. In this case, the proxy is configured to send the Data Retention system the trusted location information.

In particular embodiments of the invention, the trusted source is a gateway connecting the mobile telecommunications network to the IP network, such as a Gateway GPRS Support Node.

In other embodiments of the invention, the trusted source is a Global Positioning System locator.

The above aim 1s also achieved by an IP information header validator in a telecommunications system. The validator comprises means for detecting data packets from user equipment connected to a mobile telecommunications network and accessing an IP network through a proxy. In addition, the validator comprises means for requesting trusted location information of the user equipment from a trusted source of the telecommunications network and means for adding the trusted location information data into an IP information header of a message to be sent to a location based function.

The validator may further comprise means for detecting an IP information header comprising access network information and means for extracting data contained in the IP information header and identifying the user equipment. In this case, the validator is provided with means for comparing the trusted location information provided by the trusted source with location information detected in the IP information header.

The validator may optionally include means for asserting the information header if the location information in the information header corresponds to the location information provided from the trusted source.

Advantageously, the validator may comprise means for stripping location information in the information header if the location information in the information header does not correspond to the location information provided from the trusted source.

In the validator, there may also be means for replacing the location information in the information header if the information header does not correspond to the location information provided from the trusted source.

The aim and the objects of the invention are also achieved by a mobile telecommunications network comprising a connection to an IP network and a proxy for allowing a user equipment to access the IP network. In this network, the proxy includes a validator according to the above.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
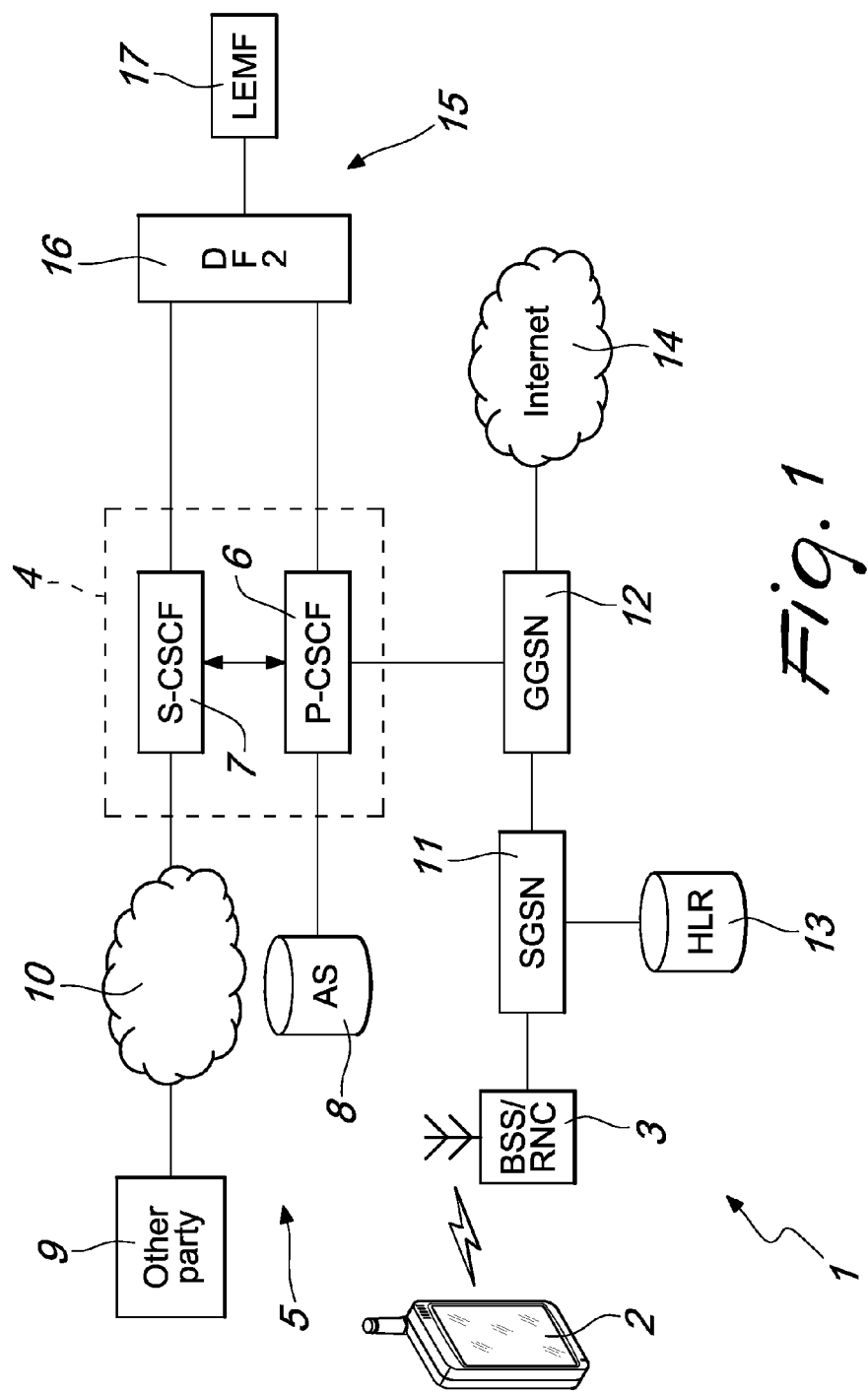
FIG. 1 is a telecommunications network according to a preferred embodiment of the invention.

With reference to FIG. 1, in a telecommunications network 1 according to a preferred embodiment of the invention, a user equipment 2 is connected to the mobile telecommunications network via an access network 3, which in the particular example depicted in the Figure is a Base Station Subsystem (BSS) or a Radio Network Controller (RNC).

The telecommunications network 1 also includes a proxy 4 which allows the user to access an IP network, which includes an IP Multimedia Subsystem (IMS) 5. The proxy is preferably a Call Session Control Function (CSCF) able to process Session Initiation Protocol (SIP) signaling packets in the IMS. More particularly, the proxy 4 is the Proxy-CSCF 6 of the IMS 5.

The IMS 5 also includes a Serving-CSCF 7, which is located in the home network and is interfaced to the Home Subscriber Server (not depicted).

The CSCFs allow the user to access an application server 8 and/or to set up a communication session with another party 9, which may belong to a different network 10.

In order to set up an IP multimedia session, a GPRS network is preferably provided, which includes a Serving GPRS Support Node (SGSN) 11 and a Gateway-GSN (GGSN) 12. The SGSN 11 is connected to the BSS/RNC 3, to the Home Location Register 13 and to the GGSN 12, which acts as an interface to the Internet 14 and to the IMS 5.

Preferably, in accordance with the 3GPP specification TS 23.060, chapter 15.1.3, the GGSN 12 is configured to request, for each Packet Data Protocol (PDP) context independently using the "CGI/SAI/RAI change report required" parameter, that the SGSN 11 report changes at either CGI, SAI, or RAI level to the GGSN 12, so that the GGSN 12 is updated with the current user equipment's location information. CGI, SAI and RAI are acronyms for Cell Global Identification, Service Area Identifier, Routing Area Identifier.

The telecommunications network 1 further comprises a Lawful Interception system 15, which includes at least one delivery function DF2 16 connected to a Law Enforcement Mediation Function (LEMF) 17. Such system may use location information for investigation purposes of a Law Enforcement Agency (LEA).

In the embodiment of FIG. 1, the P-CSCF 4 and the S-CSCF 7 are both configured as Intercept Control Elements (ICEs) of the LI system 15 and are accordingly both connected to the DF2 16, in order to send Intercept Related Information (IRI) to the DF2 16.

Obviously, only one of the P-CSCF 4 arid the S-CSCF 7 or any other node of the network 1 may act as ICE.

As an alternative or in addition to the LI system 15, a Data Retention system 18 may be provided (FIG. 2), which is connected to the P-CSCF and/or to the S-CSCF which, in this case, will act as Data Retention sources.

From now on, it will be assumed that the user of equipment 2 is the target user for either the LI system or the DR system.

As it will better discussed with reference to FIG. 2, the P-CSCF 6 is also an IP header information validator, which is configured to receive data packets from the user equipment 2, such as SIP messages, and to request trusted location information of the user equipment 2 from a trusted source, which may be the GGSN 12. The P-CSCF 6 also comprises means for adding the trusted location information data into the IP information header of at least one message, such as the P-Access-Network-Info header of the SIP messages, which will be forwarded to the intended destination or to the LI or DR system.

Such trusted location information may be used by the intended destination for providing a particular service, as well as by the Law Enforcement Agencies to have reliable location information of the target user.

If location information is already present in the IP header, because it was inserted, for instance, by the user equipment 2, the validator may optionally validate such user-provided location information by comparing it with the trusted location information and preferably replace the user-provided location information with the trusted location information. Such validation may alternatively occur in other nodes of the network where the location information is used, such as in the LI, DR, charging or other service systems.

In the description, it is to be understood that, where reference is generally made to the step of adding trusted location information in the IP header, such step does not necessarily comprise a validation step in which user-provided location information is compared with the trusted location information.

Figure 2:
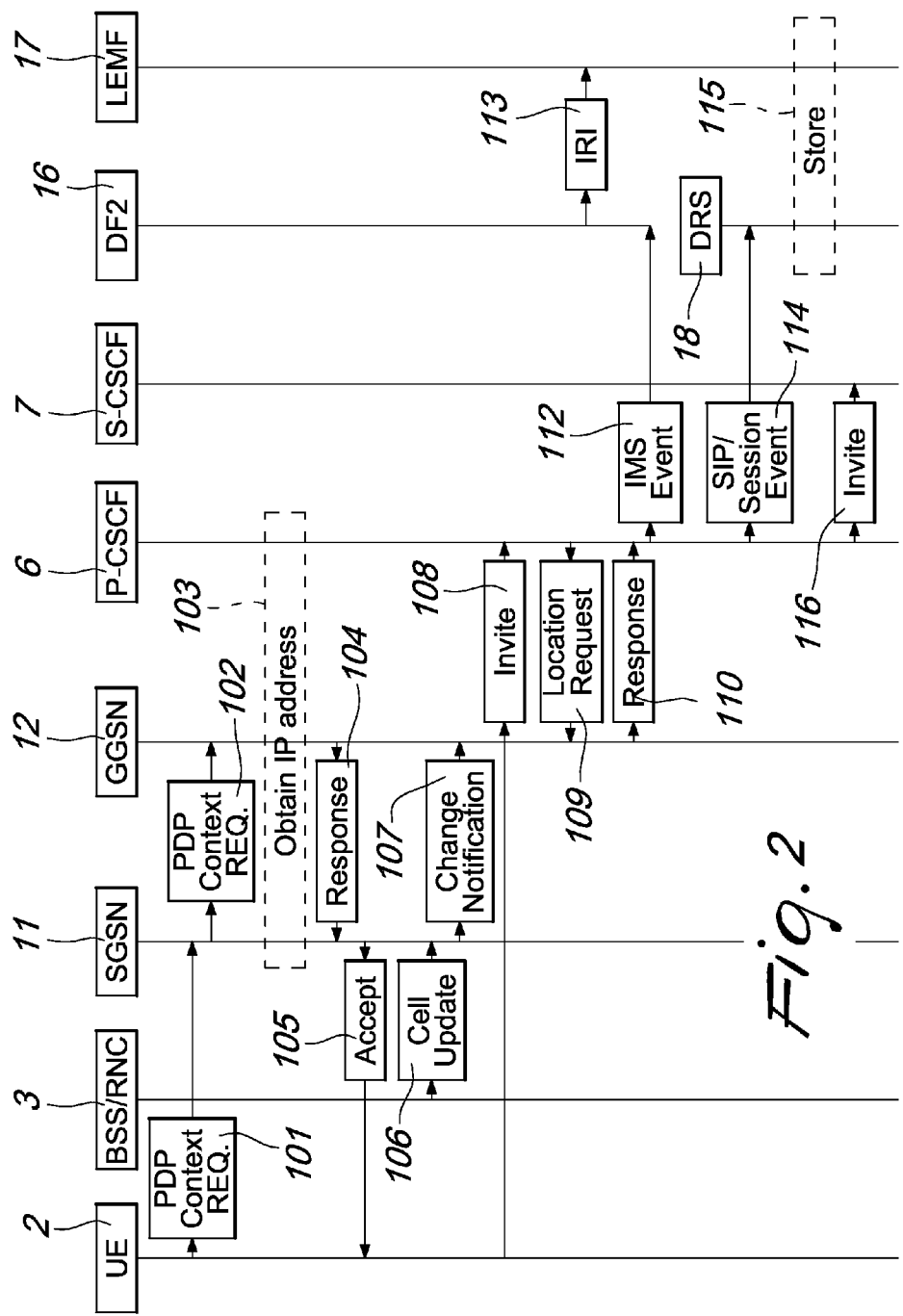
FIG. 2 is a flowchart of the method according to the preferred embodiment of the invention.
Figure 3:
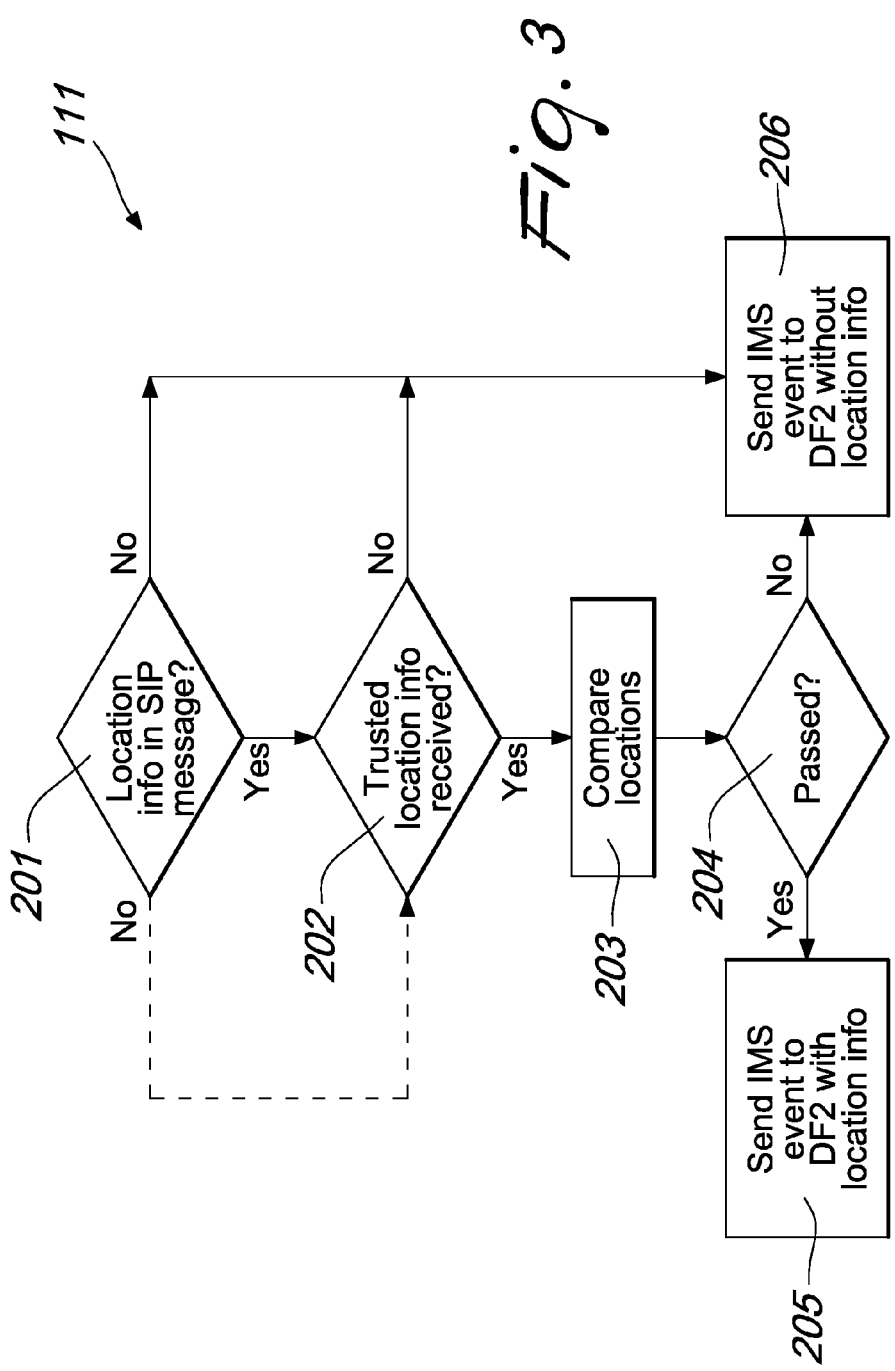
FIG. 3 is a detail of the flowchart of FIG. 2 and relating to the validation procedure at the P-CSCF.

The operation of the preferred embodiment of the invention is shown in FIGS. 2 and 3.

In steps 101-105 the PDP context is created. The UE 2, via the BSS/RNC 2, sends a PDP context request 101 to the SGSN 11 for obtaining an IP address. The SGSN 11 routes the request to the GGSN 12 (step 102) and, in step 103, the IP address is obtained. The PDP context activation procedure continues with the GGSN 12 indicating completion of the PDP context activation (step 104) and the SGSN 11 finally reporting such completion to the UE 2 (step 105).

In step 106, the BSS/RNC 3 may send updated cell information to the SGSN 11. The SGSN 11 accordingly reports to the GGSN 12 such change, because the SGSN 11 is configured to notify any changes in CGI/SAI/RAI during both mobility management and session management.

In step 108, the user equipment 2 sends a SIP INVITE request to the P-CSCF 6, which request may comprise the P_Access_Network_Info in the P-header.

Then, the P-CSCF 6 runs a validation procedure of the P_Access_Network_Info header, by sending a location request to the GGSN 12. The location information obtained from the GGSN 12, in the form of current CGI/SAI/RAI, will be considered trusted by the P-CSCF 6, as it cannot be altered or cheated by the user equipment 2 (step 109).

The P-CSCF 6 may receive from the GGSN 12 the current location information, such as the current CGI/SAI/RAI (step 110). The triggering identity/parameter sent from the P-CSCF 6 to the GGSN 12 in the location information request 109 will be the binding information received from the GGSN 12. In this way, it is avoided that the P-CSCF 6 ask location information for any user but only for the user having a SIP session going through the P-CSCF 6.

Then, in step 111, the P-CSCF 6 may trigger a validation check procedure in which the location information the user equipment may have included in the SIP message 108 is compared to the trusted location information received from the GGSN 12. Based on the outcome of the comparison, the P-CSCF 6 may decide to send or not the trusted location information to a location information based function, such as the LI system or the DR system.

More in detail, with reference to FIG. 3, in step 201 the P-CSCF 6 checks whether the user equipment 2 has provided network access information or location information in SIP request 108. This may be achieved by checking whether the P_Access_Network_Info is present in the P-header of the INVITE message sent by the user equipment 2.

If no such information is present in the SIP message, the P-CSCF 6 may generate the event notification message for the LI system or the DR system without any location information (step 206).

As an alternative, the P-CSCF 6 may proceed in any case to step 202, where it checks if location information has been received from the GGSN 12 in step 110. If no such information has been received, the procedure jumps to step 206, because it has not been possible to validate the network access information or location information sent by the user equipment. The event notified to the LI system or the DR system will accordingly contain no location information.

Otherwise, in step 203 the location information received from the GGSN 12 is compared with the P_Access_Network_Info or, more in general, with the location information from the user equipment 2, if available.

If the check is successful (step 204), i.e. if the location information from both the user equipment 2 and the GGSN 12 coincide, the method proceeds to step 205, where the P-CSCF 6 generates an event notification message for the LI system or the DR system comprising the validated and passed location information, by inserting in the event a Geolocation header field and by adding a Location by Reference URI as value (step 205).

Otherwise, if the check is unsuccessful in step 204, the P-CSCF 6 goes to the step 206 described above. As an alternative, the P-CSCF 6 may insert in the event notification message a Geolocation header field and add a Location by Reference URI as value, based on the trusted location information received from the GGSN 12.

Finally, the event message with the additional information resulting from the validation procedure 111 is sent to the mediation/delivery function of the LI system 15 or of the DR system 18, depending on which system is present in the network.

If an LI system 15 is used, the event is an IMS event and is sent in step 112 to the DF2 16, which will then build an appropriate IRI report message containing, if any, the location information validated and possibly passed in steps 202 and 204. Such IRI message is sent to the LEMF 17 (step 113).

The IRI may be subdivided into control information for the handover interface between the DF2 and the LEMF (such as correlation information) and basic data context information, for standard data transmission between the two parties, such as SIP message information.

For each SIP message, an IRI report is sent to the LEMF 17. Such report may contain a User Provided Access Information Screening Indicator and Network Provided Access Network Information. The former comprises the result of the validation step 111 when the user equipment 2 provided the network access information or the location information in the SIP message. The values may be "User provided, not validated", "User provided, validated and passed", "User provided, validated and not passed", depending on the outcome of steps 202 and 204 discussed above.

The Access Network Information provided by the IMS node (such as the P-CSCF 6) is the trusted location information arid may be included in the IRI message if the user did not provide the network access information or the location information in the SIP message, or if the user provided it but the validation did not pass in step 204.

A similar procedure is carried out if a DR system 18 is present in the network 1. The event sent by the P-CSCF 6 is a SIP Session event and is delivered to the DR system 18 in step 114, which accordingly stores the received SIP Session event data (step 115) for later retrieval by the LEMF.

The above User Provided Access Information Screening Indicator and the Network Provided Access Network Information may be stored at the DR system 18, together with the list of access network information or location information provided by the user equipment 2, the list of time stamps when the user equipment 2 or the IMS node (such as the P-CSCF 6) provided access network information or location information.

The procedure of setting up an IP communication session will then go on as in the prior art, by forwarding the SIP INVITE request of step 108 to the S-CSCF 7 (step 116) and receiving the corresponding Trying/Ringing/OK. SIP messages.

If the P-CSCF 6 has inserted the Geolocation header in the INVITE message, the S-CSCF 7 can manage the information within, e.g., the P_Access Network_Info as asserted. It could even fetch further location information deferencering the URI present within the Geolocation header.

It has been noted that the invention fully achieves the intended aim and objects. In particular, it is possible to detect fraudulent use of P_Access_Network_Information, when the user inserts false location information in SIP signaling messages, and to provide trustable user location information to the LEMF.

More in general, the detection of fraudulent use of location information may be achieved by requesting trusted information to either a network entity or to another entity able to retrieve reliable location information, such as a Global Positioning System (GPS) locator.

It is also possible to provide the location dependent interception also in the IMS as it may be provided in the wireless CS network: this dependency allows a Law Enforcement Agency to define a boundary area in which a mobile GSM subscriber can be intercepted. In this way it can be avoided to intercept a subscriber beyond the area under LEA jurisdiction.

Moreover, the invention allows to satisfy customer requirements for intercepting also for IMS subscribers within specified geographical areas.

More in general, it is possible to provide reliable location dependent services and to charge also location dependent IMS services.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A validation method for validating IP information headers in data packets received from user equipment that connect to a mobile telecommunications network and that access an IP network through a proxy, comprising:
    detecting an IP information header comprising access network information;
    extracting data contained in said IP information header and identifying said user equipment;
    requesting trusted location information of said user equipment from a trusted source of said mobile telecommunications network;
    comparing said trusted location information provided by said trusted source with location information detected in said IP information header;
    if the location information in said IP information header corresponds to said location information provided from said trusted source, asserting said IP information header;
    if the location information in said IP information header does not correspond to said location information provided from said trusted source, stripping said location information in said IP information header; and
    adding said trusted location information into an IP information header of a message to be sent to a location based function.

2. The validation method according to claim 1, wherein stripping said location information and adding said trusted location information further comprises replacing the location information in said detected IP information header with said trusted location information if said detected IP information header does not correspond to location information provided from said trusted source.

3. The validation method according to claim 1, wherein said IP network includes an IP Multimedia Subsystem and said proxy is a Call Session Control Function CSCF configured to process Session Initiation Protocol (SIP) signaling packets in the IP Multimedia Subsystem, said data packets being SIP signaling packets.

4. The validation method according to claim 1, wherein said detected IP information header is a P-Access-Network-Info header.

5. The validation method according to claim 1, wherein said proxy is an Interception Control Element and is connected to a Lawful Interception system, said proxy being configured to send the Lawful Interception system Intercept Related Information comprising said trusted location information.

6. The validation method according to claim 1, wherein said proxy is a data source and is connected to a Data Retention system, said proxy being configured to send the Data Retention system said trusted location information.

7. The validation method according to claim 1, wherein said trusted source is a gateway connecting said mobile telecommunications network to said IP network.

8. The validation method according to claim 1, wherein said trusted source is a Global Positioning System locator.

9. A network node for use in a telecommunications system, the network node comprising an IP information header validator circuit configured to:
    detect data packets from user equipment that are connected to a mobile telecommunications network and that access an IP network, said data packets each including an IP information header;
    detect an IP information header comprising access network information;
    extract data contained in said IP information header and identify said user equipment from which the IP information header was received;
    request trusted location information of said user equipment from a trusted source of said mobile telecommunications network;
    compare said trusted location information provided by said trusted source with location information detected in said IP information header;
    if the location information in said IP information header corresponds to said location information provided from said trusted source, assert said IP information header;
    if the location information in said IP information header does not correspond to said location information provided from said trusted source, strip said location information in said IP information header; and
    add said trusted location information data into an IP information header of a message to be sent to a location based function.

10. The network node according to claim 9, wherein stripping said location information and adding said trusted location information comprises replacing the location information in said detected IP information header with the trusted location information if said detected IP information header does not correspond to the location information provided from said trusted source.

11. The network node according to claim 9, wherein said detected IP information header is a P-Access-Network-Info header.

12. The network node according to claim 9, further configured to send a Lawful Interception system Intercept Related Information comprising said trusted location information.

13. The network node according to claim 9, further configured to send a Data Retention system said trusted location information.

14. A network node for use in a telecommunications system, wherein said network node includes a validator circuit configured to:
- detect data packets from user equipment that are connected to the mobile telecommunications network and that access the IP network, said data packets each including an IP information header;
- detect an IP information header comprising access network information, wherein said access network information comprises information indicating a type of access network via which the user equipment accesses the IP network;
- extract data contained in said IP information header and identify said user equipment from which the IP information header was received;
- request trusted location information of said user equipment from a trusted source of said mobile telecommunications network;
- compare said trusted location information provided by said trusted source with location information detected in said IP information header;
- assert said IP information header if the location information in said IP information header corresponds to said location information provided from said trusted source; and
- add said trusted location information data into an IP information header of a message to be sent to a location based function.

15. The validation method according to claim 1, wherein the location information detected in said IP information header and the trusted location information each comprises an identifier of a cell, service area, or routing area.

16. The validation method according to claim 1, wherein the trusted location information comprises location information trusted as representing the actual location of said user equipment, and wherein the location information detected in said IP information header comprises location information provided by a user of the user equipment and therefore not trusted as representing the actual location of said user equipment.

17. The validation method according to claim 1, wherein said requesting comprises sending to the trusted source information that is associated with said user equipment and that enables the trusted source to uniquely identify the user equipment for which trusted location information is requested.

18. The network node according to claim 14, wherein the detected IP information header is a P-Access-Network-Info header.

19. The network node according to claim 14, further configured to send a Lawful Interception system Intercept Related Information comprising said trusted location information or send a Data Retention system said trusted location information.

20. The network node of claim 14, wherein the message to be sent to a location based function comprises a Geolocation header field, and wherein adding said trusted location information data comprises inserting a uniform resource identifier (URI) into the Geolocation header field.

21. A validation method for validating IP information headers in data packets received from user equipment that connect to a mobile telecommunications network and that access an IP network through a proxy, comprising:
- detecting an IP information header comprising access network information, wherein said detected IP information header is a P-Access-Network-Info header;
- extracting data contained in said IP information header and identifying said user equipment;
- requesting trusted location information of said user equipment from a trusted source of said mobile telecommunications network;
- comparing said trusted location information provided by said trusted source with location information detected in said IP information header;
- asserting said IP information header if the location information in said IP information header corresponds to said location information provided from said trusted source; and
- adding said trusted location information into an IP information header of a message to be sent to a location based function.

22. The validation method according to claim 21, wherein said IP network includes an IP Multimedia Subsystem and said proxy is a Call Session Control Function (CSCF) configured to process Session Initiation Protocol (SIP) signaling packets in the IP Multimedia Subsystem, said data packets being SIP signaling packets.

23. The validation method according to claim 21,
- wherein said proxy is an Interception Control Element and is connected to a Lawful Interception system, said proxy being configured to send the Lawful Interception system Intercept Related Information comprising said trusted location information; or
- wherein said proxy is a data source and is connected to a Data Retention system, said proxy being configured to send the Data Retention system said trusted location information.

* * * * *